United States Patent
Lopez-Perez et al.

(10) Patent No.: US 12,040,851 B2
(45) Date of Patent: *Jul. 16, 2024

(54) COOPERATIVE BEAMFORMING IN WIRELESS NETWORK

(71) Applicant: Nokia Technologies Oy, Espoo (FI)

(72) Inventors: David Lopez-Perez, Blanchardstown (IE); Adrian Garcia Rodriguez, Santa Cruz de Tenerife (ES); Mika Kasslin, Espoo (FI); Lorenzo Galati Giordano, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 520 days.

This patent is subject to a terminal disclaimer.

(21) Appl. No.: 17/297,843

(22) PCT Filed: Jan. 11, 2019

(86) PCT No.: PCT/FI2019/050018
§ 371 (c)(1),
(2) Date: May 27, 2021

(87) PCT Pub. No.: WO2020/144392
PCT Pub. Date: Jul. 16, 2020

(65) Prior Publication Data
US 2022/0014237 A1    Jan. 13, 2022

(51) Int. Cl.
*H04B 7/024* (2017.01)
*H04B 7/06* (2006.01)
(Continued)

(52) U.S. Cl.
CPC ........... *H04B 7/024* (2013.01); *H04B 7/0617* (2013.01); *H04B 7/0626* (2013.01); *H04L 25/0226* (2013.01); *H04W 84/12* (2013.01)

(58) Field of Classification Search
None
See application file for complete search history.

(56) References Cited

U.S. PATENT DOCUMENTS

2018/0234135 A1    8/2018    Vermani et al.

FOREIGN PATENT DOCUMENTS

| NO | 2020/144393 A1 | 7/2020 |
|---|---|---|
| WO | 2016/011918 A1 | 1/2016 |

(Continued)

OTHER PUBLICATIONS

Office Action received for corresponding Indian Patent Application No. 202147033953, dated Mar. 17, 2022, 7 pages.
(Continued)

*Primary Examiner* — Kouroush Mohebbi
(74) *Attorney, Agent, or Firm* — Nokia Technologies Oy

(57) ABSTRACT

This document discloses a solution for performing internetwork beamforming cooperation. According to an aspect, a method comprises: establishing, by a first access node (112) of a first wireless network, internetwork beamforming with a second access node (110) of a second wireless network, wherein the establishment indicates at least one station (102) of the second wireless network; in response to said establishing, transmitting by the first access node (112) a channel sounding signal; receiving, by the first access node (112) from the at least one station (102) of the second wireless network, a beamforming report comprising channel state information measured from the channel sounding signal; and performing, by the first access node (112), null steering beamforming transmission in the first wireless network on the basis of the received channel state information.

18 Claims, 8 Drawing Sheets

(51) Int. Cl.
*H04L 25/02* (2006.01)
*H04W 84/12* (2009.01)

(56) References Cited

FOREIGN PATENT DOCUMENTS

WO     2018/136254 A1     7/2018
WO     WO-2018136254 A1 *  7/2018     ............. H04B 7/024

OTHER PUBLICATIONS

Office Action received for corresponding European Patent Application No. 19701267.7, dated Jun. 15, 2023, 6 pages.
Cariou et al., "EXtreme Throughput (XT) 802.11", Doc.: IEEE 802.11-18/0789r10, Intel, May 8, 2018, pp. 1-15.
Vermani et al., "16 Spatial Stream Support in Next Generation WLAN", Doc: IEEE 802.11-18/0818r3, Qualcomm, May 7, 2018, pp. 1-11.
Yang et al., "Next Generation PHY/MAC in Sub-7GHZ", doc.: IEEE 802.11-18/0846r2, Huawei, May 10, 2018, pp. 1-21.
International Search Report and Written Opinion received for corresponding Patent Cooperation Treaty Application No. PCT/FI2019/050018, dated Sep. 2, 2019, 13 pages.
"802.11AC In-Depth", Aruba Networks, White Paper, Jan. 1, 2014, 37 pages.

* cited by examiner

COOPERATIVE BEAMFORMING IN WIRELESS NETWORK

RELATED APPLICATION

This application was originally filed as PCT Application No. PCT/FI2019/050018 on Jan. 11, 2019 which is incorporated herein by reference in its entirety.

FIELD

Various embodiments described herein relate to the field of wireless communications and, particularly, to performing beamforming transmissions in a wireless network.

BACKGROUND

Constant demand of higher throughput and capacity and density of various wireless networks sets a demand for improving spectral efficiency. Beamforming is a technique where a transmitter focuses radio energy towards an intended recipient and/or reduces radio energy towards an unintended recipient. The benefit may be improved link quality and/or reduced interference towards other radio receivers, as well as an improved spatial reuse.

BRIEF DESCRIPTION

Some aspects of the invention are defined by the independent claims.

Some embodiments of the invention are defined in the dependent claims.

According to an aspect, there is provided an apparatus for a first wireless network, comprising means for performing: establishing inter-network beamforming with an access node of a second wireless network, wherein the establishment indicates at least one station of the second wireless network; in response to said establishing, transmitting a channel sounding signal; receiving, from the at least one station of the second wireless network, a beamforming report comprising channel state information measured from the channel sounding signal; and performing null steering beamforming transmission in the first wireless network on the basis of the received channel state information.

In an embodiment, the means are configured to establish the inter-network beamforming by at least transmitting a trigger message to the access node, the trigger message triggering transmission of an announcement frame by the access node, the announcement frame indicating the at least one station.

In an embodiment, the trigger message indicates the at least one station.

In an embodiment, the means are configured to receive, from the access node, an acknowledgment indicating reception of the trigger frame and to transmit the channel sounding signal after a determined time interval after the reception of the acknowledgment.

In an embodiment, the announcement frame comprises an identifier of the access node as a transmitter address, and wherein the channel sounding signal comprises an identifier of the apparatus as a transmitter address.

In an embodiment, the means are configured to detect an announcement frame transmitted by the access node, the announcement frame indicating the at least one station and to transmit the channel sounding signal in response to said detecting.

In an embodiment, the means are configured to perform the null steering beamforming transmission by steering a transmission null towards the at least one station of the second wireless network.

In an embodiment, the apparatus is an access node of the first wireless network.

According to an aspect, there is provided an apparatus for a first wireless network, comprising means for performing: receiving from a first access node, to which the apparatus is associated, an announcement frame indicating the apparatus and a second access node towards which the apparatus is in an unassociated state; receiving a channel sounding signal from the second access node; measuring the channel sounding signal on the basis of the announcement frame indicating the second access node and determining channel state information on the basis of the measured channel sounding signal; and transmitting a beamforming report comprising the channel state information to the second access node.

In an embodiment, the means are configured to perform said measuring and said transmitting the beamforming report while being in the unassociated state with the second access node.

In an embodiment, the announcement frame comprises an information element indicating that the channel sounding signal shall be transmitted by an access node to which the apparatus is not associated.

In an embodiment, the means are further configured to receive a beamforming report request message, and wherein the announcement frame comprises an information element indicating whether or not the beamforming report request message shall be transmitted by the first access node, and wherein the means are configured to transmit the beamforming report to the second access node only if the information element indicates that the beamforming report request message shall not be transmitted by the first access node.

In an embodiment, the announcement frame comprises an identifier of the first access node as a transmitter address, a broadcast address as a receiver address, and an identifier of the apparatus, and wherein the beamforming report request message comprises an identifier of the second access node as a transmitter address, a broadcast address as a receiver address, and an identifier of the apparatus.

According to another aspect, there is provided an apparatus for a first wireless network, comprising means for performing: establishing inter-network beamforming with an access node of a second wireless network; and transmitting an announcement frame, the announcement frame indicating at least one station of the first wireless network and requesting the at least one station to measure channel state information from a channel sounding signal transmitted by the access node and to transmit a beamforming report to the access node.

In an embodiment, the announcement frame is a null data packet announcement frame of an IEEE 802.11 network.

In an embodiment, the means are configured to establish the inter-network beamforming by at least receiving a trigger message from the access node, the trigger message triggering the transmission of the announcement frame.

In an embodiment, the means are configured to establish the inter-network beamforming by exchanging with the access node an inter-network beamforming setup request message indicating the at least one station of the first wireless network and an inter-network beamforming setup response message indicating the at least one station of the first wireless network and, further, by transmitting to the at least one station of the first wireless network a beamforming address set update message comprising an identifier of the access node.

In an embodiment, the means described above comprise: at least one processor; and at least one memory including computer program code, the at least one memory and computer program code configured to, with the at least one processor, cause the performance of the apparatus.

According to another aspect, there is provided a method comprising: establishing, by a first access node of a first wireless network, inter-network beamforming with a second access node of a second wireless network, wherein the establishment indicates at least one station of the second wireless network; in response to said establishing, transmitting by the first access node a channel sounding signal; receiving, by the first access node from the at least one station of the second wireless network, a beamforming report comprising channel state information measured from the channel sounding signal; and performing, by the first access node, null steering beamforming transmission in the first wireless network on the basis of the received channel state information.

In an embodiment, said establishing comprises transmitting a trigger message to the second access node, the trigger message triggering transmission of an announcement frame by the second access node, the announcement frame indicating the at least one station.

In an embodiment, the trigger message indicates the at least one station.

In an embodiment, the method further comprises receiving, from the second access node, an acknowledgment indicating reception of the trigger frame and transmitting the channel sounding signal after a determined time interval after the reception of the acknowledgment.

In an embodiment, the announcement frame comprises an identifier of the access node as a transmitter address, and wherein the channel sounding signal comprises an identifier of the apparatus as a transmitter address.

In an embodiment, the method comprises detecting an announcement frame transmitted by the second access node, the announcement frame indicating the at least one station and transmitting the channel sounding signal in response to said detecting.

In an embodiment, the first access node performs the null steering beamforming transmission by steering a transmission null towards the at least one station of the second wireless network.

According to another aspect, there is provided a method comprising: receiving, by a station from a first access node to which the station is associated, an announcement frame indicating the station and a second access node towards which the station is in an unassociated state; receiving, by the station, a channel sounding signal from the second access node; measuring, by the station, the channel sounding signal on the basis of the announcement frame indicating the second access node and determining channel state information on the basis of the measured channel sounding signal; and transmitting, by the station, a beamforming report comprising the channel state information to the second access node.

In an embodiment, the station performs said measuring and said transmitting the beamforming report while being in the unassociated state with the second access node.

In an embodiment, the announcement frame comprises an information element indicating that the channel sounding signal shall be transmitted by an access node to which the apparatus is not associated.

In an embodiment, the station receives a beamforming report request message, and wherein the announcement frame comprises an information element indicating whether or not the beamforming report request message shall be transmitted by the first access node, and wherein the station transmits the beamforming report to the second access node only if the information element indicates that the beamforming report request message shall not be transmitted by the first access node.

In an embodiment, the announcement frame comprises an identifier of the first access node as a transmitter address, a broadcast address as a receiver address, and an identifier of the station, and wherein the beamforming report request message comprises an identifier of the second access node as a transmitter address, a broadcast address as a receiver address, and an identifier of the station.

According to another aspect, there is provided a method comprising: establishing, by a first access node of a first wireless network, inter-network beamforming with a second access node of a second wireless network; and transmitting by the first access node an announcement frame, the announcement frame indicating at least one station of the first wireless network and requesting the at least one station to measure channel state information from a channel sounding signal transmitted by the second access node and to transmit a beamforming report to the second access node.

In an embodiment, the announcement frame is a null data packet announcement frame of an IEEE 802.11 network.

In an embodiment, said establishing comprises the first access node receiving a trigger message from the second access node, the trigger message triggering the transmission of the announcement frame.

In an embodiment, said establishing comprises exchanging, by the first access node with the second access node, an inter-network beamforming setup request message indicating the at least one station of the first wireless network and an inter-network beamforming setup response message indicating the at least one station of the first wireless network and, further, transmitting by the first access node to the at least one station of the first wireless network a beamforming address set update message comprising an identifier of the second access node.

According to another aspect, there is provided a computer program product embodied on a computer-readable medium and comprising a computer program code readable by a computer, wherein the computer program code configures the computer to carry out a computer process comprising: establishing, by a first access node of a first wireless network, inter-network beamforming with a second access node of a second wireless network, wherein the establishment indicates at least one station of the second wireless network; in response to said establishing, transmitting by the first access node a channel sounding signal; receiving, by the first access node from the at least one station of the second wireless network, a beamforming report comprising channel state information measured from the channel sounding signal; and performing, by the first access node, null steering beamforming transmission in the first wireless network on the basis of the received channel state information.

According to another aspect, there is provided a computer program product embodied on a computer-readable medium and comprising a computer program code readable by a computer, wherein the computer program code configures the computer to carry out a computer process comprising: receiving, by a station from a first access node to which the station is associated, an announcement frame indicating the station and a second access node towards which the station is in an unassociated state; receiving, by the station, a channel sounding signal from the second access node; measuring, by the station, the channel sounding signal on the basis of the announcement frame indicating the second access node and determining channel state information on the basis of the measured channel sounding signal; and transmitting, by the station, a beamforming report comprising the channel state information to the second access node.

According to another aspect, there is provided a computer program product embodied on a computer-readable medium and comprising a computer program code readable by a computer, wherein the computer program code configures the computer to carry out a computer process comprising: establishing, by a first access node of a first wireless network, inter-network beamforming with a second access node of a second wireless network; and transmitting by the first access node an announcement frame, the announcement frame indicating at least one station of the first wireless network and requesting the at least one station to measure channel state information from a channel sounding signal transmitted by the second access node and to transmit a beamforming report to the second access node.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
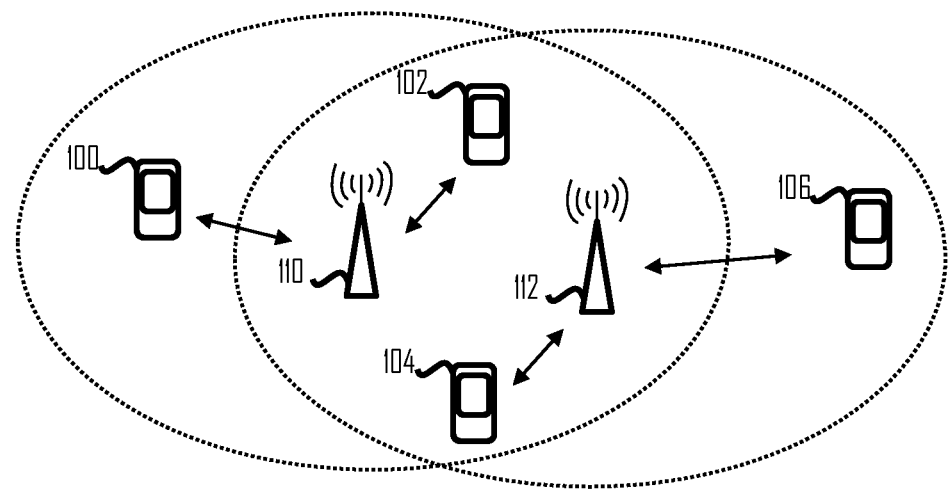

A general wireless communication scenario to which embodiments of the invention may be applied is illustrated in FIG. 1. FIG. 1 illustrates wireless communication devices comprising a plurality of access points (AP) 110, 112 and a plurality of wireless terminal devices or stations (STA) 100 to 106. Each AP may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP, and a general term for an apparatus managing a wireless network such as the BSS and providing the stations with wireless services is an access node. The APs 102, 104 may also provide access to other networks, e.g. the Internet. In another embodiment, the BSS may comprise a plurality of APs to form an extended service set (ESS), e.g. the AP 110 or 112 may belong to the same ESS with another AP and have the same service set identifier (SSID). While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

IEEE 802.11 specifications specify a data transmission mode that includes a primary channel and secondary channels. The primary channel is used in all data transmissions and, in addition to the primary channel, one or more secondary channels may be employed for additional bandwidth. The transmission band of a BSS may contain the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel.

Some IEEE 802.11 networks employ channel contention based on carrier sense multiple access with collision avoidance (CSMA/CA) for channel access. Every device attempting to gain a TXOP is reducing a backoff value while the primary channel is sensed to be idle for a certain time interval. The backoff value may be selected randomly within a range defined by a contention window parameter. The contention window may have different ranges for different types of traffic, thus affecting priority of the different types of traffic. The channel sensing may be based on sensing a level of radio energy in the radio channel. The sensed level may be compared with a threshold: if the sensed level is below the threshold level, the channel may be determined to be idle (otherwise busy). Such a procedure is called clear channel assessment (CCA) in 802.11 specifications. When the backoff value reaches zero, the STA gains the TXOP and starts frame transmission. If another STA gains the TXOP before that, the backoff value computation may be suspended, and the STA continues the backoff computation after the TXOP of the other STA has ended and the primary channel is sensed to be idle. The time duration (the backoff value) may not be decremented during the TXOP of the other STA, but the time duration that already lapsed before the suspension may be maintained, which means that the device now has a higher probability of gaining the TXOP. A secondary channel may be used in the transmission if it has been free for a determined time period (may be the same or different time period than that used for gaining the TXOP) just before TXOP start time in order for the contending device to take the secondary channel in use.

The STA 100 to 106 may be considered to be a terminal device or a station capable of connecting or associating to any one of the APs 110, 112. The STA may establish a connection with any one of APs it has detected to provide a wireless connection within the neighbourhood of the STA. The connection establishment may include authentication in which an identity of the STA is established in the AP. The authentication may comprise setting up an encryption key used in the BSS. After the authentication, the AP and the STA may carry out association in which the STA is fully registered in the BSS, e.g. by providing the STA with an association identifier (AID). A separate user authentication may follow association, which may also comprise building an encryption key used in the BSS. It should be noted that in other systems terms authentication and association are not necessarily used and, therefore, the association of the STA to an AP should be understood broadly as establishing a connection between the STA and the AP such that the STA is in a connected state with respect to the AP and waiting for downlink frame transmissions from the AP and monitoring its own buffers for uplink frame transmissions. A STA not associated to the AP is in an unassociated state. An unassociated STA may still exchange some frames with the AP, e.g. discovery frames.

For the sake of the following description, let us assume a situation where the stations 100 and 102 are associated to the access node 110 while the stations 104 and 106 are associated to the access node 112. Further, the access nodes 110, 112 manage different wireless networks having different network identifiers, e.g. different SSIDs. FIG. 1 illustrates coverage areas of the respected networks. Stations 100 to 104 are located within the coverage area of the access node 110 while the stations 102 to 106 are located within the coverage area of the access node 112. Stations 104 and 102 are thus within a communication range of both access nodes 110, 112. It means that the access node 112 is a potential source of interference to the station 102 and the access node 110 is a potential source of interference to the station 104. Since the station 102 is not associated to the access node 112, overall performance of the wireless network of the access node 110 could be improved if the access node 112 reduced interference towards the station 102. The same applies to the station 104 and the wireless network of the access node 112: reduction of interference from the access node 110 towards the station 104 would improve the performance of a link between the access node 112 and the station 104.

The access nodes 110, 112 may comprise an antenna array that enables beamforming. As known in the art, beamforming or spatial filtering is a signal processing technique used for directional signal transmission or reception. The spatial filtering is achieved by combining signals in the antenna array in such a way that signals transmitted to particular angles experience constructive interference while signals transmitted to other angles experience destructive interference. Beamforming can be used at both the transmitting and receiving ends in order to achieve spatial selectivity. The improvement is directivity of radio signal to desired directions and reduction in the emitted radio energy to undesired directions.

Figure 2:
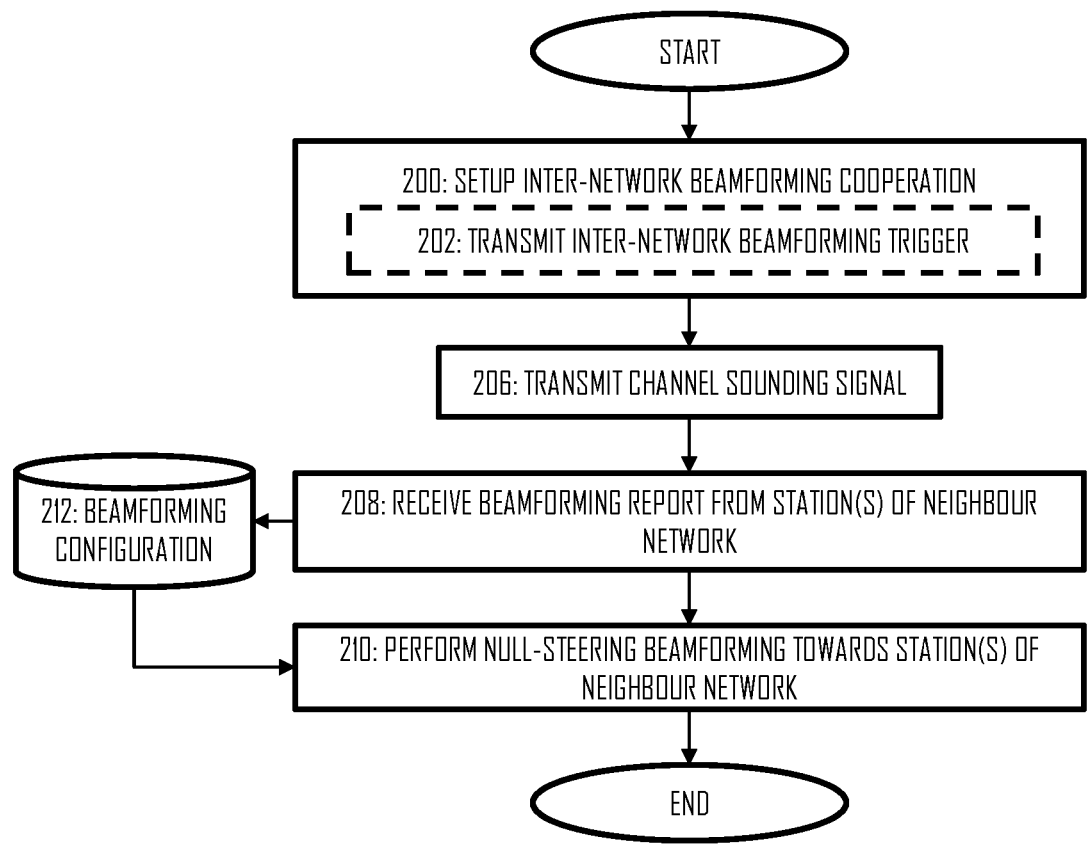
FIGS. 2 to 4 illustrate some embodiment of processes for setting up and operating inter-network beamforming cooperation.
Figure 3:
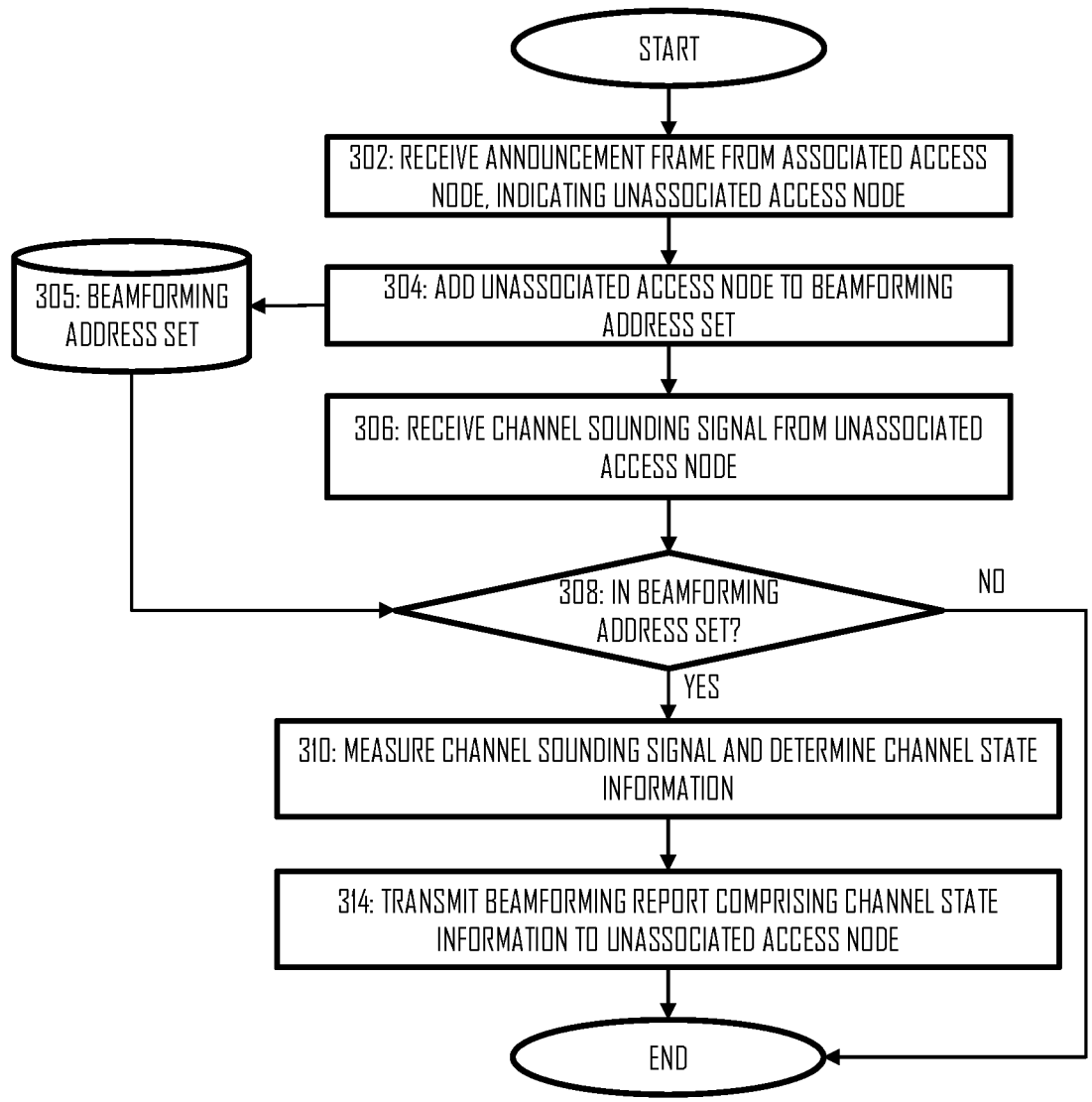
Figure 4:
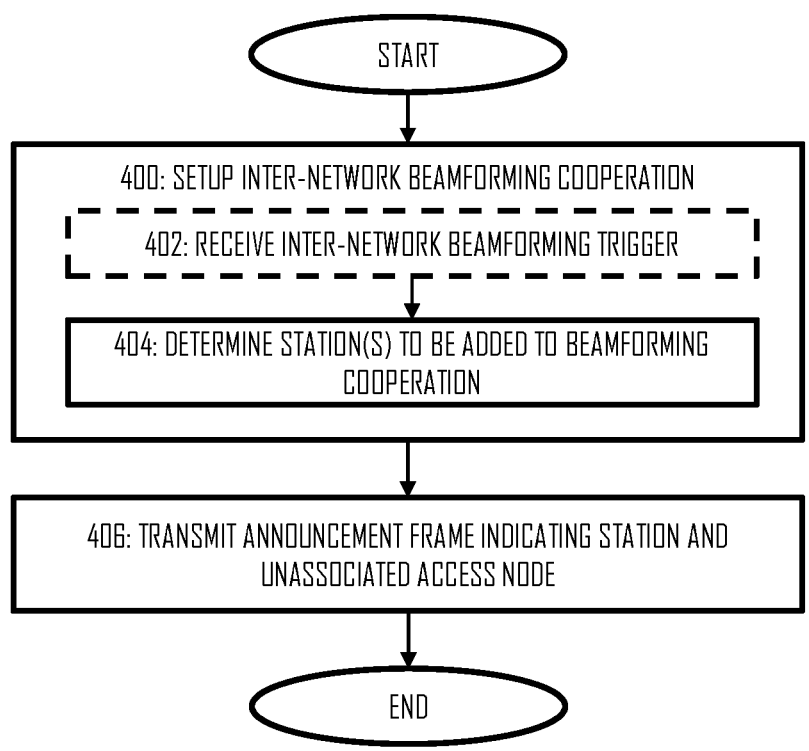

Null steering is a beamforming technique where a transmission null is directed to the undesired directions. For example, the access node 112 may try to steer a transmission null towards the station 102. Effective use of null steering would require channel state information on a radio channel between the access node 112 and the station 102. Since the station 102 is in an unassociated state with respect to the access node 112, the access node 112 may not acquire the channel state information directly from the station 102. FIGS. 2 to 4 illustrate processes according to some embodiments for performing inter-network beamforming cooperation. FIG. 2 illustrates a process executed in one of the access nodes, e.g. the access node 112, FIG. 3 illustrates a process executed in a station, e.g. the station 102, and FIG. 4 illustrates a process executed in another access node, e.g. the access node 110.

Referring to FIG. 2, the access node 112 may first setup the inter-network beamforming cooperation with the access node 110 in block 200. The setup may indicate at least one station associated to the access node 110, e.g. the station 102. In an embodiment, the setup comprises the access node 112 transmitting an inter-network beamforming trigger frame to the access node. The trigger frame may indicate the at least one station and trigger transmission of an announcement frame by the access node, the announcement frame indicating the at least one station. In block 206, the access node 112 transmits a channel sounding signal in block 206. Thereafter, the access node 112 receives, from the at least one station associated to the access node 110, a beamforming report comprising channel state information. Upon receiving the channel state information, the access node 112 performs null steering beamforming transmission in its wireless network on the basis of the received channel state information.

In an embodiment, the transmission of the channel sounding signal is responsive to the access node 112 detecting the announcement frame. As a consequence, the access node 112 may wait until it detects the announcement frame and, only thereafter, transmits the channel sounding signal. In this manner, the access node 112 may verify that the at least one station are available for the channel sounding.

In another embodiment, the access node 112 may count a determined time interval from the transmission of the trigger frame or from reception of an acknowledgment (ACK) to the reception of the trigger frame from the access node 110. The determined time interval may be long enough to allow the access node 110 to transmit the announcement frame.

Referring to FIG. 3, the station 102 receives from the access node 110, to which the apparatus is associated, an announcement frame indicating the station 102 and the access node 112 towards which the station 102 is in an unassociated state. Upon receiving the announcement frame, or other information setting the station 102 up for the beamforming cooperation, the station 102 may add an identifier of the access node 112 to a beamforming address set 305. Thereafter, e.g. directly thereafter, the station 102 receives a channel sounding signal from the access node 112. Since the access node is comprised in the beamforming address set 305 (YES in block 308), the station 102 measures the channel sounding signal and determines channel state information on the basis of the measured channel sounding signal (block 310). In block 314, the station 102 transmits a beamforming report comprising the channel state information to the access node 112.

If the station 102 receives a channel sounding signal from an access node to which the station 102 is not associated in block 306 and the access node is not in the beamforming address set, the process may end (NO in block 308). As a consequence, the access node may carry out block 310 only upon receiving the announcement frame from the access node 110 that indicates that the channel sounding shall be performed by the access node 112 and upon receiving the channel sounding signal from the access node 112.

Referring to FIG. 4, the access node 110 may set up the inter-network beamforming with the access node 112 in block 400. Block 400 may comprise at least determining one or more stations associated to the access node 110 that shall be added to the inter-network beamforming cooperation (block 404). Block 400 may also comprise the reception of the inter-network beamforming trigger (block 402) from the access node that triggers the transmission of the announcement frame. After the setup, the access node 110 transmits the announcement frame indicating the at least one station 102 and requesting the at least one station 102 to measure channel state information from a channel sounding signal transmitted by the access node and to transmit a beamforming report to the access node 112.

In an embodiment, the station 102 adding the identifier of the access node to a beamforming address set means that the station 102 shall measure the channel state information and report the channel state information to the access node upon requested by the access node, that is perform blocks 310 and 314 as a response to block 306.

In an embodiment, the transmission of the beamforming report is triggered by the access node 112 transmitting a beamforming report request message indicating the at least one station 102. The beamforming report request may be transmitted after transmitting the channel sounding signal, e.g. directly after. Upon receiving the beamforming report request, the station 102 may respond to the beamforming report request by transmitting the beamforming report to the access node 112. Since the access node 112 is identified in the beamforming address set, the station 102 is configured to respond to the beamforming report request accordingly. In other words, the announcement frame may comprise an information element indicating that the beamforming report request message shall be transmitted by the access node 112, and the station 102 transmits the beamforming report only if the information element indicates that the beamforming report request message shall be transmitted by the access node 112 and if the beamforming report request message is received from the access node 112. In another embodiment, the channel sounding signal received from the access node 112 serves also as the trigger for the transmission of the beamforming report. The station 102 may have acquired necessary information for transmitting the beamforming report and the channel state information from the announcement frame in this embodiment. Contents of the announcement frame are discussed next.

In an embodiment, the announcement frame is a null data packet announcement (NDPA) frame of 802.11 specifications. The NDPA frame may indicate stations the access node 100 requests to measure the channel state information (CSI), and the NDPA frame may contain information on the requested CSI, e.g. what type of information the CSI shall contain. In an embodiment, the announcement frame indicates only station(s) of the network of the access node 110 transmitting the announcement frame. Below, an example of the NDPA frame is illustrated:

| Control | Duration | RA | TA | Sounding Dialog Token | STA1 | ... | STA N | FCS |
|---|---|---|---|---|---|---|---|---|
| 2 | 2 | 6 | 6 | 1 | 4 | | 4 | 4 |

The number below each item represents the length of the respective item in octets. Frame Control field specifies the type of the frame, and Duration field specifies the duration of the frame. RA is a receiver address, and TA is a transmitter address. The RA may be a medium access control (MAC) address of a target station in case of unicast transmission, or it may be a broadcast address. The TA may be a MAC address or a SSID of the access node 110. The Sounding Dialog Token may announce that the frame is a high-efficiency (HE) NDPA frame. The STA1 to STA N fields may identify the N stations that are requested to perform the channel sounding measurements, i.e. to execute block 310. The table below illustrates an embodiment of contents of the field STA N. Frame Check Sequence (FCS) may be used for error detection/correction.

| AID10 | Partial BW Info | Feedback Type & Ng | Disambiguation | Sounding by unassociated AP | Codebook Size | Nc |
|---|---|---|---|---|---|---|
| 10 | 14 | 2 | 1 | 1 | 1 | 3 |

The number below each item represents the length of the respective item in bits. AID10 contains the least significant bits of an association identifier of the station identified by the field. In this case, 10 least significant bits is used but the number of bits may be different. Partial bandwidth (BW) information field may be used to specify a measurement band in terms of resource units. Disambiguation bit may be set to value '1' for a HE frame. The Feedback Type & Ng and Codebook size sub-fields define a type of channel state information to be determined in block 310, such as quantization resolution, single-user/multi-user feedback type, and precoding codebook size. Sounding by Unassociated access node (AP) may comprise bit indicating that the channel sounding signal shall be transmitted by an unassociated access node. In an embodiment, the NDPA frame comprises an address such as a SSID of such an unassociated access node. In another embodiment, the address of the unassociated access node is delivered to the station beforehand, e.g. during setup of the inter-network beamforming described below in FIG. 8.

In an embodiment, the channel sounding signal is a null data packet (NDP) of 802.11 specifications. In an embodiment where the announcement frame is the NDPA frame and the channel sounding signal the NDP, the NDP may be transmitted a short inter-frame space (SIFS) after the NDPA frame. As described above, upon detecting the NDPA frame transmitted by the access node 110, the access node 112 may wait for SIFS and then transmit the NDP frame. The NDP may carry no payload, i.e. no data field. It may yet comprise training sequence fields to enable the measurements in block 310 and, additionally, one or more signalling fields. The signalling fields may comprise a transmitter address field comprising an identifier of the access node 112, e.g. the SSID of the access node 112. The signalling fields may comprise a receiver address field comprising a broadcast address.

In an embodiment, the beamforming report request is a beamforming report poll (BFRP) trigger frame of 802.11 specifications. In an embodiment where the announcement frame is the NDPA frame, the channel sounding signal the NDP, and the beamforming report request the BFRP trigger frame, the access node 112 may transmit the BFRP trigger frame the SIFS after the NDP. The station 102 may then execute block 314 after the SIFS has expired from the reception of the BFRP trigger frame. The channel contention described above may be used for the transmission of the beamforming report.

As described above, the at least one station of the wireless network of the access node 110 may form a subset of stations of the wireless network of the access node 110, e.g. a subset of terminal devices served by the access node 110. For example, the station 100 not within the coverage area of the access node 112 may be omitted from the inter-network beamforming cooperation. One or more stations within the coverage area of the access node 112 may equally be omitted for various reasons, e.g. low battery status.

Figure 5:
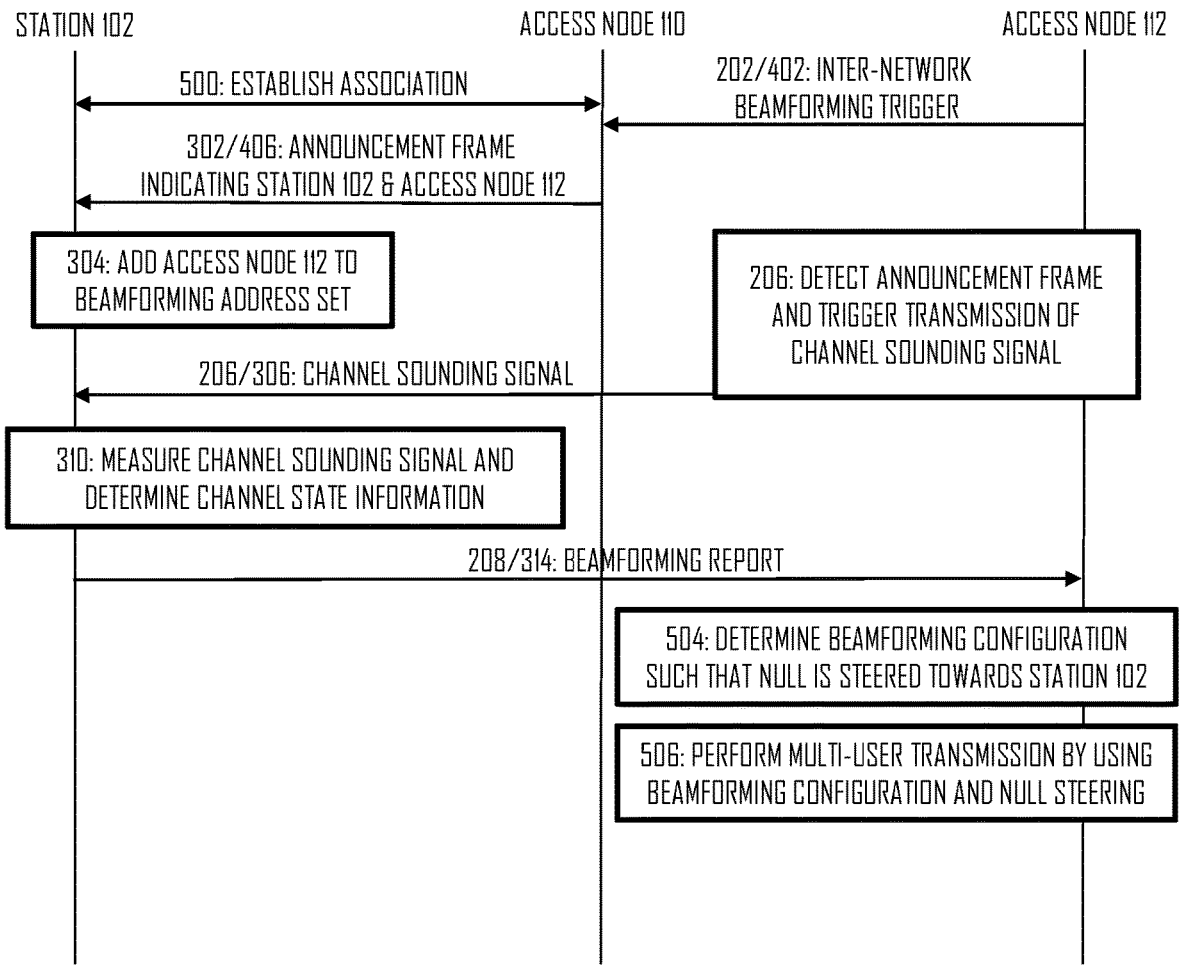
FIGS. 5 to 8 illustrate signalling diagrams according to some embodiments of the inter-network beamforming cooperation.

FIGS. 5 to 8 illustrate various signalling diagrams combining the embodiments of FIGS. 2 to 4, i.e. illustrating the setup and execution of the inter-network beamforming cooperation. Referring to FIG. 5 the station 102 may associate to the access node 110 in step 500 in the above-described manner. The access node 112 may transmit the inter-network beamforming trigger frame to the access node 110 in step 202, and the access node 110 receives the trigger frame in step 402. The access node 110 may acknowledge the reception of the request by transmitting an ACK message.

In this embodiment, the access node 112 may indicate the station 102 of the wireless network of the access node 110 in the trigger frame. The access nodes 110 and 112 may exchange measurement reports acquired from the stations of the respective networks. A measurement report may comprise measured signal strengths of signals received and measured by a station from various access nodes, associated and/or unassociated with the station. Accordingly, the measurement report the station 102 has measured and transmitted to the access node 110 may comprise a signal strength of a signal the station 102 has received from the access node 112. When the access node 110 shares the measurement report with the access node 112, the access node 112 becomes aware that it potentially interferes with the station 102 and null steering would improve the performance of the station 102. The determination may be made by comparing the signal strength of the signal received measured by the station from the access node 112 with a threshold. If the signal strength exceeds the threshold, the access node 112 may determine to indicate the station 102 in the trigger frame in step 202.

In step 406, the access node 110 transmits the announcement frame to the station 102, and the station 102 receives the announcement frame in step 302. The station 102 may then execute block 304 by adding the SSID of the access node 112 to the beamforming address set. The station 102 may decide whether or not to enter the beamforming cooperation and either enter the SSID of the access node 112 in the beamforming address set or not. Let us now assume that the SSID of the access node 112 is entered to the beamforming address set.

Upon detecting the announcement frame in block 206, the access node 112 may perform the channel sounding for the null steering towards the station(s) associated to the access node 110. Accordingly, the access node 112 transmits the channel sounding signal in step 206. Upon receiving the channel sounding signal and detecting the identifier of the access node 112 in the channel sounding signal, the station 102 may perform the measurements on the channel sounding signal and compute the channel state information, as specified in the announcement frame (block 310). The station may determine a format of the channel state information on the basis of the announcement frame, as described above.

Upon receiving the beamforming report request from the access node 112 in step 312, or in direct response to the channel sounding signal, the station 102 may transmit the beamforming report comprising the channel state information to the access node 112 in step 314 in the above-described manner. Upon receiving the beamforming report in step 208 from the station 102, the access node 112 may determine, on the basis of the channel state information comprised in the beamforming report, the beamforming configuration such that a transmission null is steered towards the station 102 (block 504). In block 506, the access node 112 carries out a (multi-user) transmission to stations associated to the access node 112 by using the beamforming configuration determined in step 504. With the help of the channel state information measured by the station 102, interference towards the station 102 is reduced during the transmission.

Figure 6:
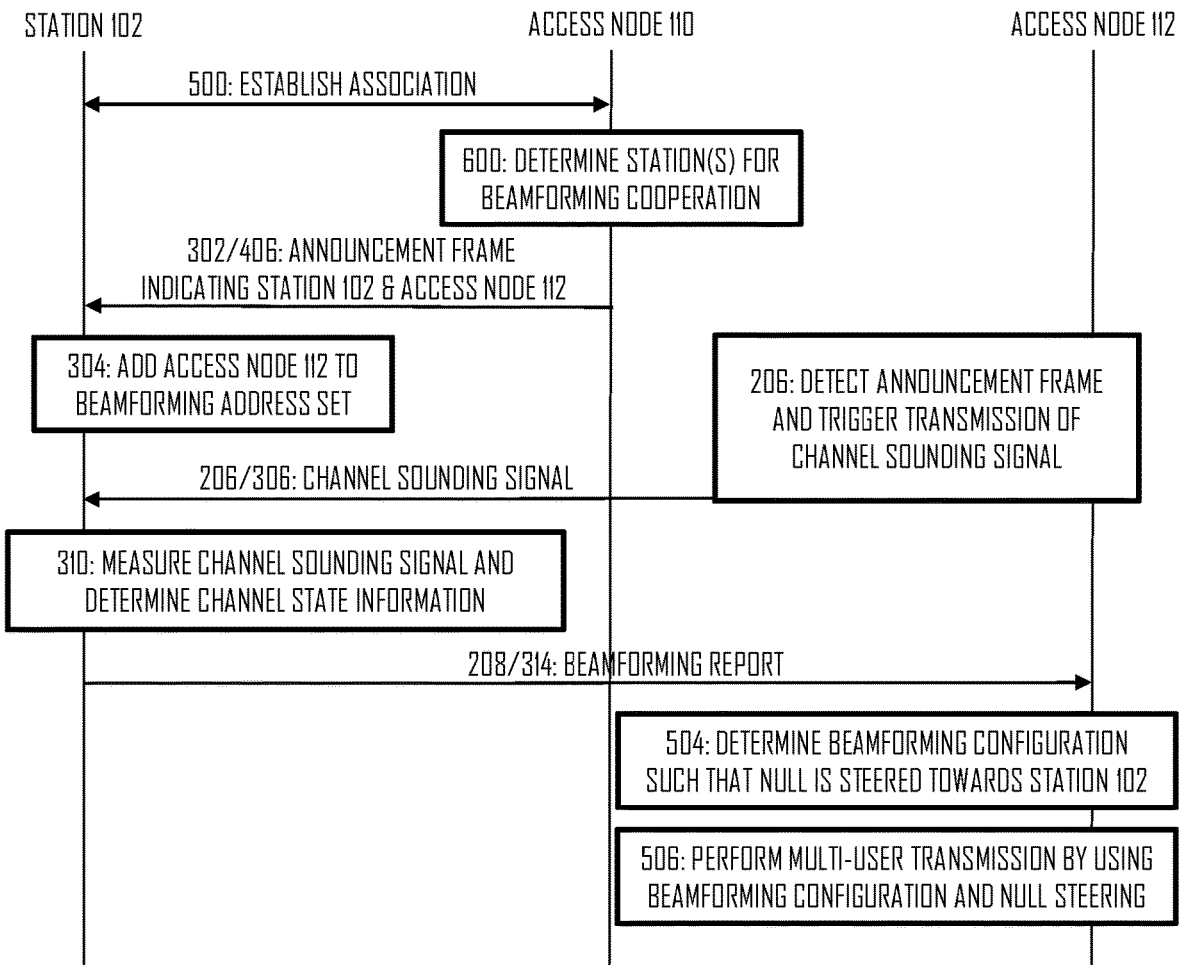

FIG. 6 illustrates a modification of the embodiment of FIG. 5 where the access node 110 autonomously detects the need for triggering the channel state measurements for the inter-network beamforming cooperation. Instead of delivering the measurement reports to the access node 112 for the triggering, the access node 110 may perform the threshold comparison or detect that a station associated to the access node potentially suffers from interference from the access node 112. The access node may select the station and, optionally, other stations for the beamforming cooperation in block 600 and, as a consequence, trigger the transmission of the announcement frame in step 406. The access node 112 may be configured to monitor for an announcement frame and, upon detecting the announcement frame, transmit the channel sounding signal without a separate trigger frame. In another embodiment, upon detecting the need for triggering the channel state measurements for the inter-network beamforming cooperation, the access node 110 may transmit a channel sounding request frame to the access node 112. Upon receiving the channel sounding request frame, the access node 112 may determine whether or not to perform the channel sounding for null steering towards a station associated to the access node 110. Upon determining to perform the channel sounding, the access node 112 may transmit a channel sounding response frame to the access node 110, acknowledging the channel sounding. The channel sounding response frame may then function as the trigger frame described above and cause the access node 110 to transmit the announcement frame.

Figure 7:
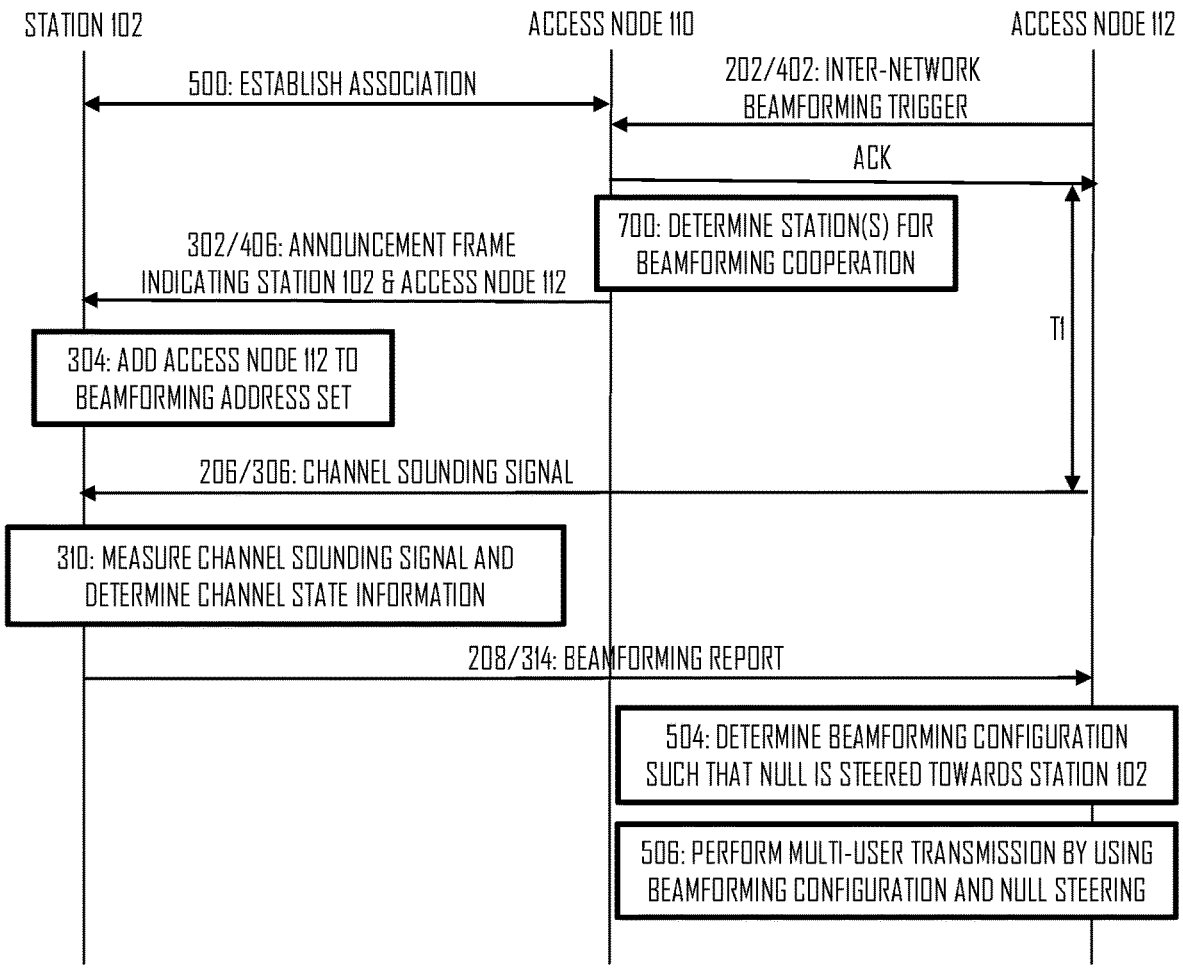

In an embodiment, the inter-network beamforming setup may be performed for a first set of stations of the wireless network of the access node 110, and the access node 110 may indicate a subset of the first set of stations in the announcement frame. FIG. 7 illustrates such an embodiment. The access node 112 may request for performing the channel measurements for the first set of stations in the trigger frame in step 202/402, and the access node 110 removes one or more stations from the first set on a basis of a determined criterion in block 700. Then, the announcement frame indicates only a subset of the first set.

FIG. 7 also illustrates the embodiment where the transmission of the channel sounding signal is synchronized with the transmission of the trigger frame in step 202 or reception of an acknowledgment (ACK) to the reception of the trigger frame. Upon transmitting the trigger frame or receiving the ACK, the access node 112 may start a timer counting the determined time interval T1. Upon the timer expiring, the access node 112 may trigger the transmission of the channel sounding signal in step 206. Meanwhile, the access node 110 has transmitted the announcement frame in step 406, e.g. after SIFS from the reception of the trigger frame.

Figure 8:
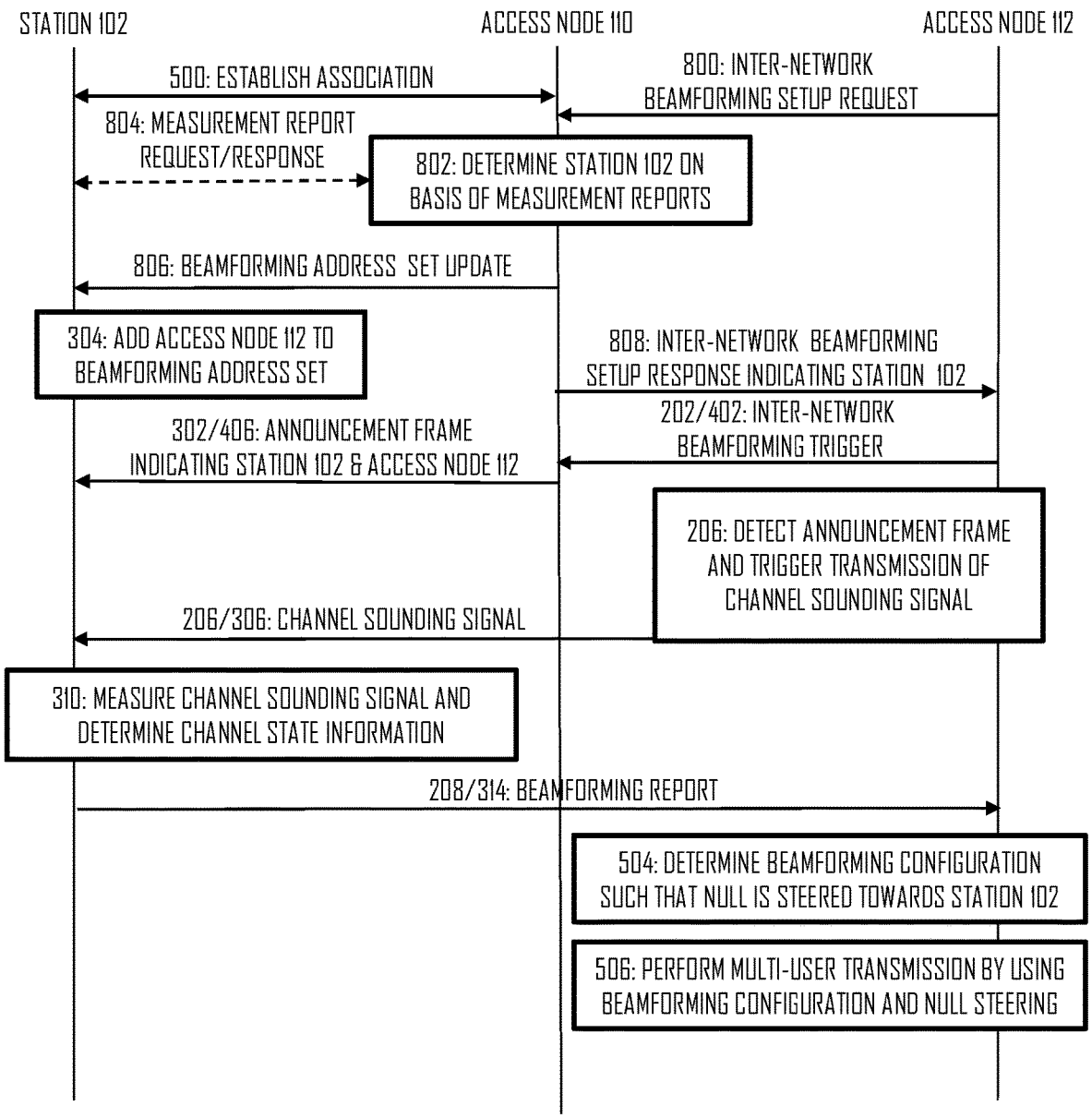

In an embodiment, a separate setup phase may precede the transmission of the inter-network beamforming trigger frame in FIG. 5 or block 600 in FIG. 6. FIG. 8 illustrates such an embodiment as applied to the embodiment of FIG. 5. A similar setup phase may be executed in the embodiment of FIG. 6 or 7 as well.

Referring to FIG. 8, the setup phase of block 200 and 400 may comprise the access node 112 transmitting an inter-network beamforming setup request to the access node 110

(step 800) and receiving, from the access node 110 as a response to the inter-network beamforming setup request message, an inter-network beamforming setup response message indicating that at least one station of the wireless network of the access node 110 has added an identifier of the access node 112 to a beamforming address set (step 808).

In an embodiment, the access node 112 may indicate no station of the wireless network of the access node 110 in the request. In step 802, the access node 110 determines the station(s) to be entered to the beamforming cooperation, e.g. on the basis of measurement reports received from the stations associated to the access node 110. A criterion for entering a station to the beamforming cooperation may be that the station has reported a signal strength of the access node 112 above a determined threshold. The access node 110 may thus use the signal strengths and the threshold as a measure of whether or not a particular station is within a coverage area of the access node 112. If the access node 110 determines that a measurement report from a station is not available or has expired, the access node may request the station to send the measurement report in step 804. Upon receiving the request in step 502, the station may measure a beacon signal or another signal received from detected access nodes and send the measurement report. If the measurement report does not indicate a signal strength of the access node 112 or reports the signal strength of the access node 112 below the threshold, the station may be omitted from the beamforming cooperation with the access node. Let us, however, assume that the signal strength reported by the station 102 is above the threshold and, as a consequence, the access node 110 selects the station 102 to the beamforming cooperation with the access node.

In step 806, the access node 110 transmits a beamforming address set update request to the station 102, and the station 102 receives the request in step 302. The station 102 may acknowledge the reception of the request. The beamforming address set update request may comprise an identifier of the access node 112, e.g. an SSID of the access node 112. Upon receiving the beamforming address set update request from the access node 110, the station 102 may add the SSID of the access node 112 to the beamforming address set. The station 102 may decide whether or not to enter the beamforming cooperation and either acknowledge or deny entering the SSID of the access node 112 in the beamforming address set to the access node 110.

Upon selecting the station(s) and updating respective beamforming address set(s) in the respective station(s), the access node 110 may transmit the inter-network beamforming setup response message in step 808 and identify the station(s) in the response. The response may comprise, as an identifier of a station, the determined number of least significant bits of the association identifier (AID) of the station. A SSID, BSSID or the address of the access node 110 may serve as a further identifier of the station to make the identification globally unique, as described above. In an embodiment, the access node 110 may insert signal strength values of the access node 112 as reported by the station(s) to the response, and the access node 112 may use the signal strength values in determining which station(s) to request to perform the channel sounding measurements. The access node 112 receives the response in step 808.

Upon determining that the station(s) of the neighbouring network(s) have been entered to the beamforming cooperation, the access node 112 may perform the channel sounding for the null steering towards such station(s), e.g. by transmitting the inter-network beamforming trigger frame in step 202. Thereafter, the process may proceed, as described above with reference to FIG. 5. In the embodiment of FIG. 6, the access node 110 may, after step 808, autonomously trigger the transmission of the announcement frame and the process may proceed as described above with reference to FIG. 6.

In another embodiment, the access node 112 indicates one or more unassociated stations in the inter-network beamforming setup request of step 800. The access node 112 may measure a signal strength of uplink transmissions of stations not associated to the access node and select one or more stations for the beamforming cooperation by using the above-described signal strength threshold. Another option for acquiring the signal strength is a measurement report reported by the unassociated station and received by the access node 112 from the access node 110. One or more unassociated stations from which a signal is received at a level above the threshold may be selected by the access node 112. Upon receiving the request in step 800, the access node 110 may transmit the beamforming address set update message of step 806 to one or more stations indicated by the access node 112 in the request, including the station 102. If all the indicated stations are entered to the beamforming cooperation, the access node 110 needs not to separately indicate the stations in the response of step 808. However, if there is a difference between a set of stations indicated in the request and a set of stations entered to the beamforming cooperation, the access node 110 may specify the difference in the response.

In yet another embodiment, the access node 110 may transmit the inter-network beamforming setup request to the access node 112 and indicate the station associated to the access node 110 in the request. For example, the access node 110 detects, on the basis of the measurement report(s), that the station is susceptible to the inter-network interference from the access node 112 and, as a consequence, initiates the setup of the inter-network beamforming cooperation for the station 102 and with the access node 112. Steps 806 and 304 may be carried out before or after transmitting the inter-network beamforming cooperation request message. In any case, steps 806 and 304 may be carried out before transmitting the announcement frame indicating the station 102 and the access node 112.

In the embodiments described above, the access nodes 110, 112 are within the communication range of one another and, thus, capable of exchanging radio frames in steps 202, 204, 402, and 408, for example. Instead of radio interface, another type of interface may be provided to enable communication between the access nodes 110, 112. The interface may be a wired interface, or the access nodes may communicate via a router or repeater. In some embodiments, the access nodes may be connected to a centralized controller that controls at least some parameters of the access nodes. Such a centralized controller may mediate the exchange of messages or control the setup of the beamforming cooperation. Such embodiments may solve a hidden station problem where the access nodes cannot directly communicate with one another but there exist a station that suffers from interference from an unassociated access node.

In an embodiment, the transmission of the announcement frame is triggered on time-based or event-based manner. An example of the time-based manner is periodic transmission of the announcement frame. The access node 112 may periodically transmit the trigger frame, or the access node 110 may periodically and autonomously transmit the announcement frame indicating the station 102. An example of the event-based manner is detecting a drop in the performance of the station or that a measurement report received from the station indicates interference from the access node. Upon detecting such an event, the access node 112 may transmit the trigger frame. Upon detecting such an event, the access node 110 may transmit the announcement frame indicating the station 102 and the access node 112.

Figure 9:
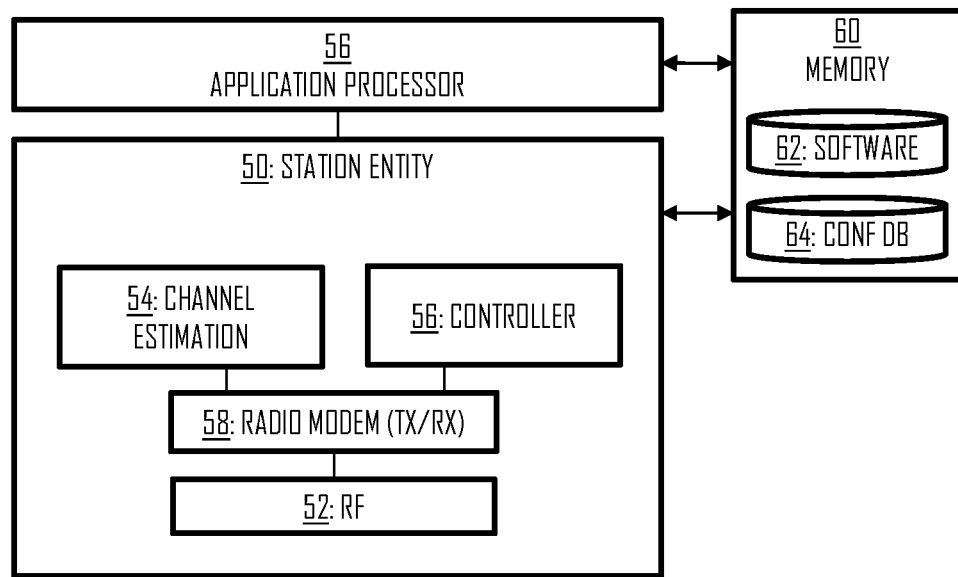
FIGS. 9 and 10 illustrate block diagrams of structures of apparatuses according to some embodiments of the invention.

FIG. 9 illustrates an embodiment of a structure of the above-mentioned functionalities of an apparatus executing the functions of the station in the process of FIG. 3 or any one of the embodiment described above for the station 102. The apparatus may be a terminal device or a client device of a wireless network, e.g. the 802.11 network. In other embodiments, the apparatus may be a circuitry or an electronic device realizing some embodiments of the invention in the wireless device. The apparatus may comply with 802.11 specifications. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention.

Referring to FIG. 9, the apparatus may comprise a station entity 50 providing the apparatus with capability of communicating in the wireless network of the access node 110. The station entity may comprise a radio interface 52 providing the apparatus with radio communication capability. The radio interface 52 may comprise radio frequency converters and components such as an amplifier, filter, frequency-converter, (de)modulator, and encoder/decoder circuitries and one or more antennas. The station entity 50 may further comprise a radio modem 58 configured to carry out transmission and reception of messages in the wireless network.

The station entity 50 may further comprise a channel estimation circuitry 54 configured to measure a signal strength from a received radio signal and to determine other channel state information such as precoding parameters. The channel estimation circuitry may be configured to execute block 310 and to generate the channel state information.

The station entity 50 may further comprise a controller 56 configured to control transmissions and functions of the station entity 50. The controller 56 may, for example, control the establishment of the association in step 500, to control the channel estimation circuitry to perform the channel estimation, and to control the radio modem to transmit the beamforming report to the access node to which the apparatus is not currently associated, as described above. The station entity may comprise at least one processor comprising the controller 56 and the channel estimation circuitry and, optionally, at least some of the circuitries of the radio modem 58.

The apparatus may further comprise an application processor 56 executing one or more computer program applications that generate a need to transmit and/or receive data through the station entity 50. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

The apparatus may further comprise a memory 60 storing one or more computer program products 62 configuring the operation of said processor(s) of the apparatus. The memory 60 may further store a configuration database 64 storing operational configurations of the apparatus. The configuration database 64 may, for example, store the beamforming address set 305.

Figure 10:
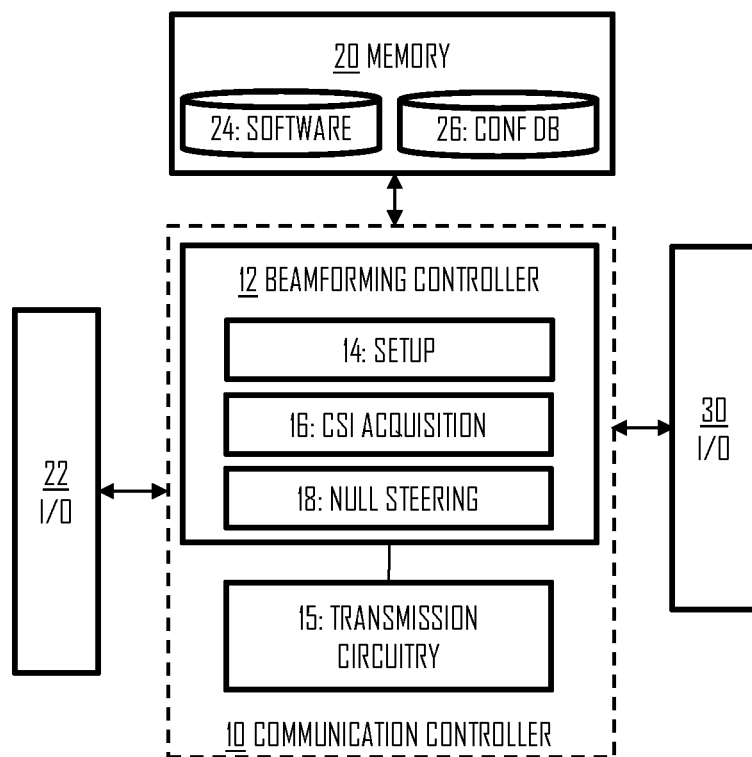

FIG. 10 illustrates an embodiment of a structure of the above-mentioned functionalities of an apparatus executing the functions of the access node in the process of FIG. 2 and/or FIG. 4 any one of the embodiment described above for the access nodes 110 and 112. The access nodes 110 and 112 may be identical and both support all the functions described above for either access node 110, 112. In another embodiment, the apparatus carrying out the above-described functionalities of the access node is comprised in such a device, e.g. the apparatus may comprise a circuitry, e.g. a chip, a chipset, a processor, a micro controller, or a combination of such circuitries in the access node. The apparatus may be an electronic device comprising electronic circuitries for realizing some embodiments of the access node.

Referring to FIG. 10, the apparatus may comprise a first communication interface 22 or a communication circuitry configured to provide the apparatus with capability for bidirectional communication with stations over a radio interface. The communication interface may comprise radio frequency circuitries for processing received control frames and data frames and control frames and data frames to be transmitted. The communication interface 22 may comprise standard well-known components such as an antenna array, amplifier, a filter, a frequency converter, and encoder/decoder circuitries.

The apparatus may further comprise a second communication interface 30 or a communication circuitry configured to provide the apparatus with capability for bidirectional communication with other access nodes and the centralized controller described above. In an embodiment, the apparatus communicates with the other access nodes through the communication interface 22 used for communication with the stations. The communication interface 30 may comprise circuitries for processing messages described above in connection with steps 202, 402, 800 and 808, for example. The communication interface 22 may comprise standard well-known components such as an amplifier, a filter, and encoder/decoder circuitries.

The apparatus may further comprise a memory 20 storing one or more computer program products 24 configuring the operation of at least one processor 10 of the apparatus. The memory 20 may further store a configuration database 26 storing operational configurations of the apparatus, e.g. measurement reports received from the stations associated to the apparatus and the beamforming configuration 212.

The apparatus may further comprise the at least one processor 10 configured to carry out the process of FIG. 2 or any one of its embodiments, or the process of FIG. 4 or any one of its embodiments. The processor may comprise a communication controller controlling the operation of the access node. Referring to FIG. 10, the processor(s) 10 comprise(s) a beamforming controller 12 and a transmission circuitry 15. The transmission circuitry may carry out frame transmissions in a wireless network managed by the apparatus. The frame transmissions may include transmissions of frames to stations associated to the apparatus in which case the transmission circuitry may employ the beamforming configuration 212 currently stored in the configuration database 26. The frame transmissions may include the setup of the beamforming cooperation, as described above. In such a case, the transmission circuitry 15 may employ a beamforming configuration that does or does not use the null steering, e.g. omnidirectional transmission.

The beamforming controller 12 may comprise a beamforming setup circuitry 14 configured to perform the setup of the beamforming cooperation in block 202 or 402, depending on whether the apparatus is transmitting or receiving the trigger frame. The beamforming setup circuitry may support both blocks 200 and 400. For the generation of the beamforming configuration, the beamforming controller 12 may comprise a channel state information (CSI) acquisition circuitry configured to select stations to be involved in the generation, control the transmission of the announcement frame and the beamforming report request in step 206. Upon receiving the beamforming reports from the stations, a null steering circuitry 15 may compute the beamforming configuration such that transmission null(s) is/are directed towards unassociated stations and transmission energy is directed towards associated stations. The null steering circuitry 18 may then store the beamforming configuration in the configuration database 26.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 8 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus configured to operate in a first wireless network, the apparatus comprising at least one processor and at least one memory including computer program code; the at least one memory and the computer program code configured to, with the at least one processor, cause the apparatus at least to:
   establish inter-network beamforming with an access node of a second wireless network, wherein said establishment comprises indicating at least one station of the second wireless network;
   in response to said establishing, transmit a channel sounding signal;
   receive, from the at least one station of the second wireless network, a beamforming report comprising channel state information measured from the channel sounding signal;
   perform null steering beamforming transmission in the first wireless network on the basis of the received channel state information;
   the apparatus being further configured to establish the inter-network beamforming by at least transmitting a trigger message indicating the at least one station to the access node, the trigger message triggering transmission of an announcement frame by the access node, the announcement frame indicating the at least one station; and
   transmit the channel sounding signal after a determined time interval after the transmission of the trigger frame or after the reception of an acknowledgment to the reception of the trigger frame from the access node, the determined time interval being long enough to allow the access node to transmit the announcement frame.

2. The apparatus of claim 1, wherein the trigger message is indicative of the at least one station.

3. The apparatus of claim 1 wherein the at least one memory and the computer program code are further configured to, with the at least one processor, cause the apparatus to receive, from the access node, an acknowledgment indicating reception of the trigger frame and to transmit the channel sounding signal after a determined time interval after the reception of the acknowledgment.

4. The apparatus of claim 1, wherein the announcement frame comprises an identifier of the access node as a transmitter address, and wherein the channel sounding signal comprises an identifier of the apparatus as a transmitter address.

5. The apparatus of claim 1 wherein the at least one memory and the computer program code are further configured to, with the at least one processor, cause the apparatus to detect an announcement frame transmitted by the access node, the announcement frame indicating the at least one station and to transmit the channel sounding signal in response to said detecting.

6. The apparatus of claim 1 wherein the at least one memory and the computer program code are further configured to, with the at least one processor, cause the apparatus to perform the null steering beamforming transmission by steering a transmission null towards the at least one station of the second wireless network.

7. The apparatus of claim 1, wherein the apparatus is an access node of the first wireless network.

8. An apparatus configured to operate in a first wireless network, the apparatus comprising at least one processor and at least one memory including computer program code; the at least one memory and the computer program code configured to, with the at least one processor, cause the apparatus at least to:
receive from a first access node, to which the apparatus is associated, an announcement frame indicating the apparatus and a second access node towards which the apparatus is in an unassociated state;
receive a channel sounding signal from the second access node;
measure the channel sounding signal on the basis of the announcement frame indicating the second access node and determining channel state information on the basis of the measured channel sounding signal; and
transmit a beamforming report comprising the channel state information to the second access node;
wherein the announcement frame is triggered by a trigger message transmitted from the second access node to the first access node; and the channel sounding signal is transmitted after a determined time interval being long enough to allow the first access node to transmit the announcement frame.

9. The apparatus of claim 8 wherein the at least one memory and the computer program code are further configured to, with the at least one processor, cause the apparatus to perform said measuring and said transmitting the beamforming report while being in the unassociated state with the second access node.

10. The apparatus of claim 8, wherein the announcement frame comprises an information element indicating that the channel sounding signal shall be transmitted by an access node to which the apparatus is not associated.

11. The apparatus of claim 8 wherein the at least one memory and the computer program code are further configured to, with the at least one processor, cause the apparatus to: receive a beamforming report request message, and wherein the announcement frame comprises an information element indicating whether or not the beamforming report request message shall be transmitted by the first access node, and transmit the beamforming report to the second access node only if the information element indicates that the beamforming report request message shall not be transmitted by the first access node.

12. The apparatus of claim 8, wherein the announcement frame comprises an identifier of the first access node as a transmitter address, a broadcast address as a receiver address, and an identifier of the apparatus, and wherein the beamforming report request message comprises an identifier of the second access node as a transmitter address, a broadcast address as a receiver address, and an identifier of the apparatus.

13. An apparatus configured to operate in a first wireless network, the apparatus comprising at least one processor and at least one memory including computer program code; the at least one memory and the computer program code configured to, with the at least one processor, cause the apparatus at least to:
establish inter-network beamforming with an access node of a second wireless network; and
transmit an announcement frame, the announcement frame indicating at least one station of the first wireless network and requesting the at least one station to measure channel state information from a channel sounding signal transmitted by the access node and to transmit a beamforming report to the access node;
wherein the channel sounding signal is transmitted by the access node after a determined time interval being long enough to allow the apparatus to transmit the announcement frame.

14. The apparatus of claim 13, wherein the announcement frame is a null data packet announcement frame of an IEEE 802.11 network.

15. The apparatus of claim 13 wherein the at least one memory and the computer program code are further configured to, with the at least one processor, cause the apparatus to: establish the inter-network beamforming by at least receiving a trigger message from the access node, the trigger message triggering the transmission of the announcement frame.

16. The apparatus of claim 13 wherein the at least one memory and the computer program code are further configured to, with the at least one processor, cause the apparatus to: establish the inter-network beamforming by exchanging with the access node an inter-network beamforming setup request message indicating the at least one station of the first wireless network and an inter-network beamforming setup response message indicating the at least one station of the first wireless network and, further, by transmitting to the at least one station of the first wireless network a beamforming address set update message comprising an identifier of the access node.

17. A method comprising:
establishing, by a first access node of a first wireless network, inter-network beamforming with a second access node of a second wireless network, wherein the establishment indicates at least one station of the second wireless network;
in response to said establishing, transmitting by the first access node a channel sounding signal;
receiving, by the first access node from the at least one station of the second wireless network, a beamforming report comprising channel state information measured from the channel sounding signal; and
performing, by the first access node, null steering beamforming transmission in the first wireless network on the basis of the received channel state information;
wherein establishing the inter-network beamforming is performed by at least transmitting a trigger message indicating the at least one station to the second access node, the trigger message triggering transmission of an announcement frame by the second access node, the announcement frame indicating the at least one station; and
transmitting the channel sounding signal after a determined time interval after the transmission of the trigger frame or after the reception of an acknowledgment to the reception of the trigger frame from the access node, the determined time interval being long enough to allow the access node to transmit the announcement frame.

18. A method comprising:
receiving, by a station from a first access node to which the station is associated, an announcement frame indicating the station and a second access node towards which the station is in an unassociated state;

receiving, by the station, a channel sounding signal from the second access node;

measuring, by the station, the channel sounding signal on the basis of the announcement frame indicating the second access node and determining channel state information on the basis of the measured channel sounding signal; and transmitting, by the station, a beamforming report comprising the channel state information to the second access node;

wherein the announcement frame is triggered by a trigger message transmitted from the second access node to the first access node; and the channel sounding signal is transmitted by the second access node after a determined time interval being long enough to allow the first access node to transmit the announcement frame.

* * * * *